US012106204B2

United States Patent
Qi et al.

(10) Patent No.: US 12,106,204 B2
(45) Date of Patent: Oct. 1, 2024

(54) ADAPTIVE BRAIN-COMPUTER INTERFACE DECODING METHOD BASED ON MULTI-MODEL DYNAMIC INTEGRATION

(71) Applicant: ZHEJIANG UNIVERSITY, Zhejiang (CN)

(72) Inventors: Yu Qi, Hangzhou (CN); Yueming Wang, Hangzhou (CN); Xinyun Zhu, Hangzhou (CN); Kedi Xu, Hangzhou (CN); Gang Pan, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/777,956

(22) PCT Filed: Oct. 27, 2021

(86) PCT No.: PCT/CN2021/126580
§ 371 (c)(1),
(2) Date: May 18, 2022

(87) PCT Pub. No.: WO2022/142653
PCT Pub. Date: Jul. 7, 2022

(65) Prior Publication Data
US 2023/0244909 A1    Aug. 3, 2023

(30) Foreign Application Priority Data
Dec. 29, 2020    (CN) .......................... 202011593629.3

(51) Int. Cl.
*G06N 3/045*    (2023.01)
*G06F 3/01*    (2006.01)
(Continued)

(52) U.S. Cl.
CPC ............. *G06N 3/045* (2023.01); *G06F 3/015* (2013.01); *G06N 3/047* (2023.01); *G06N 3/08* (2013.01)

(58) Field of Classification Search
CPC .......... G06N 3/045; G06N 3/047; G06N 3/08; G06N 3/04; G06N 7/01; G06F 3/015
See application file for complete search history.

(56) References Cited

U.S. PATENT DOCUMENTS

2015/0245928 A1*  9/2015  Kao .................... G06N 3/08
                                                        700/90
2016/0048753 A1    2/2016  Sussillo et al.
2020/0175354 A1*  6/2020  Volodarskiy ............. G06N 3/08

FOREIGN PATENT DOCUMENTS

CN    109770900    5/2019
CN    112001306    11/2020

OTHER PUBLICATIONS

Qi et al., "Dynamic Ensemble Modeling Approach to Nonstationary Neural Decoding in Brain-Computer Interfaces", Nov. 2, 2019, arXiv:1911.00714v1, pp. 1-10. (Year: 2019).*

(Continued)

*Primary Examiner* — Brent Johnston Hoover
(74) *Attorney, Agent, or Firm* — Jiwen Chen; Joywin IP Law PLLC

(57) ABSTRACT

The present invention discloses an adaptive brain-computer interface decoding method based on multi-model dynamic ensemble, where a traditional state-space model is improved, and a set of measurement functions instead of one fixed measurement function are used to dynamically characterize a relationship between observation variables and state variables; and, by using a pool of linear and nonlinear decoders, and in a decoding process of a brain-computer interface system, decoders are automatically switched according to the data, so as to realize adaptive brain signal (Continued)

decoding. Through the above multi-model ensemble strategy, linear and nonlinear decoder capabilities can be integrated, the accuracy and stability of the brain-computer interface system can be improved, and decoding unstability caused by the non-stationary neural signal of the brain-computer interface system can be solved to a certain extent.

8 Claims, 2 Drawing Sheets

(51) Int. Cl.
    *G06N 3/047*      (2023.01)
    *G06N 3/08*      (2023.01)

(56) References Cited

OTHER PUBLICATIONS

Dantas et al., "Neural Decoding Using a Nonlinear Generative Model for BrainComputer Interface", 2014, 2014 IEEE International Conference on Acoustic, Speech and Signal Processing (ICASSP), pp. 4683-4687. (Year: 2014).*

Yu Qi et al., "Dynamic Ensemblle Modeling Approach to Nonstationary Neural Decoding in Brain-Computer Interfaces", 33rd Conference on Neural Information Processing Systems, (NeurIPS 2019), pp. Nos. 1-10, Nov. 2019.

* cited by examiner

ADAPTIVE BRAIN-COMPUTER INTERFACE DECODING METHOD BASED ON MULTI-MODEL DYNAMIC INTEGRATION

This is a U.S. national stage application of PCT Application No. PCT/CN2021/126580 under 35 U.S.C. 371, filed Oct. 27, 2021 in Chinese, claiming priority to Chinese Patent Applications No. 202011593629.3, filed Dec. 29, 2020, all of which are hereby incorporated by reference.

FIELD OF TECHNOLOGY

The present invention relates to the field of motor neural signal decoding, in particular to an adaptive brain-computer interface decoding method based on multi-model dynamic ensemble.

BACKGROUND TECHNOLOGY

Brain-computer interfaces directly decode motion intentions from neural signals for external device control. Intracortical brain-computer interfaces use neural signals recorded by implanted electrode arrays to extract motion-related information. Advances in the intracortical brain-computer interfaces have led to the significant development of exoskeleton devices and computer cursor control.

In the intracortical brain-computer interface systems, neural decoding algorithms play an important role. Scholars have proposed many algorithms to decode motion information from the neural signals, including population vector methods, optimal linear estimation methods, deep neural networks, and recursive Bayesian decoders. Among these methods, the Kalman filter combines the evolution process of a trajectory as prior knowledge to make prediction more accurate, so it is widely used in online cursor control and exoskeleton control, achieving a best performance so far.

For example, Chinese patent document with publication number CN107669416A discloses a wheelchair system and control method based on continuous-brisk motor imagery neural decoding, comprising an electroencephalogram signal acquisition system, a decoding device and an electric wheelchair connected in sequence; the decoding device comprises a continuous motor imagery electroencephalogram signal processing module and a brisk motor imagery electroencephalogram signal processing module that are arranged in series, where the two modules are respectively used to decode the continuous motor imagery electroencephalogram signal and the brisk motor imagery electroencephalogram signal transmitted by the electroencephalogram signal acquisition system.

However, the unstability of the neural signals is a great challenge in the neural decoding process. Most of the neural decoders used in current intracortical brain-computer interfaces assume a stable functional relationship between the neural signals and kinematics, and therefore use a fixed decoding model. However, during online decoding, signals generated by neurons occasionally introduce noise or disappear altogether; at the same time, because of the plasticity of the neurons, brain activity may also change over time. Because of the noise and change described above, a neural signal-to-kinematic mapping function may be unstable and change continuously over time. A fixed decoding function can lead to an unstable and inaccurate decoding result, so it needs to be retrained every time period to maintain a certain performance.

Decoders proposed for coping with neural variabilities can be classified into two categories. The first category of the decoders, which are the most common decoders today, still uses fixed models, relying on periodic retraining or incrementally updating model parameters online to maintain performance. The second category of the decoders uses dynamic models to track the changes in the neural signals, which can avoid the cost of retraining and are more suitable for long-term decoding tasks. However, few studies in such methods dare to directly model unstable neural signals.

Therefore, in motor neural decoding, how to use dynamic models to model the unstability of the neural signals to achieve a stable decoding performance is an important problem to be solved in the current motor neural decoding field.

SUMMARY OF THE INVENTION

The present invention provides an adaptive brain-computer interface decoding method based on multi-model dynamic ensemble, which can greatly reduce the influence of unstability of the neural signals on decoding performance and improve the robustness of a decoder.

An adaptive brain-computer interface decoding method based on multi-model dynamic ensemble, where the method comprises the following steps:

(1) obtaining the original motor neural signal from electrodes, and after pre-processing the original motor neural signal, dividing the signal into a training set, a validation set and a test set;

(2) building a state-space decoder based on the multi-model dynamic ensemble, which is specified as follows:

(2-1) with an improved state-space model, using a pool of candidate models to dynamically characterize a relationship between observation variables and state variables, where the pool of candidate models comprises a linear function, a second-order polynomial function, and two neural networks. Here, the observation variables are neural signals, and the state variables are motion signals;

(2-2) dynamically combining the candidate models according to a Bayesian update mechanism as an observation function of the state-space model;

(3) using the training set and the validation set to train and evaluate the improved state-space model, and obtaining the parameters of different candidate models by training;

(4) using the test set to test the performance and robustness of the model.

In the method of the present invention, the observation function in a Kalman filter is improved and replaced with a pool of models that can be dynamically assembled online, so as to better adapt to the changes of the neural signals. During the decoding process, these models are automatically selected and combined according to the Bayesian update mechanism, thereby greatly reducing the influence of the unstability of the neural signals on the decoding performance and improving the robustness of the decoder.

In the step (1), the specific process of the pre-processing is as follows:

selecting an appropriate window size to calculate the firing rate of the neural signal, intercepting a valid data segment according to a state label, normalizing and smoothing the data respectively, and obtaining the pre-processed motor neural signal.

Preferably, the data in paradigm preparation and return phases can be removed, and an actual operation phase can be selected for analysis.

Preferably, when performing the normalizing and smoothing operations, a z-score function and a filter function can be used to normalize and smooth each dimension of the motion signal, and smooth the firing rate of each neuron of the neural signal. The specific smoothing coefficients can be selected according to actual needs.

In the step (2), the expression of the improved state-space model is as follows:

$$x_k = f(x_{k-1}) + v_{k-1}$$

$$y_k = h_{H_k}(x_k) + n_k$$

where, k represents a discrete time step; $x_k \in R^{d_x}$ represents a state of interest; $f(\cdot)$ represents a state transition function; $y_k \in R^{d_y}$ represents an observation or measurement variable; $n_k$ represents an independent and identically distributed observation noise; $\mathcal{H}_k \in \{1, 2, \ldots, M\}$ represents a model index in the observation function $h(\cdot)$, $\mathcal{H}_k = m$ represents that the model in action at the moment k is $h_m$.

In the step (2), the Bayesian update mechanism is as follows:

dynamically selecting and switching among a pool of candidate models in a data-driven manner, where given an observation sequence $y_{0:k}$, the posterior probability of the state at the moment k is:

$$p(x_k|y_{0:k}) = \sum_{m=1}^{M} p(x_k|\mathcal{H}_k = m, y_{0:k}) p(\mathcal{H}_k = m|y_{0:k})$$

Where, $p(x_k|\mathcal{H}_k = m, y_{0:k})$ is the posterior of the state when $\mathcal{H}_k = m$; $p(\mathcal{H}_k = m|y_{0:k})$ is the posterior probability of selecting the m-th model; M represents the number of the candidate models.

Considering that $p(\mathcal{H}_k = m|y_{0:k})$ is obtained by iteration of $p(\mathcal{H}_{k-1} = m|y_{0:k-1})$, preferably, the Bayesian formula can be used to calculate the posterior probability of selecting the m-th model at the moment k. The formula thereof is as follows:

$$p(\mathcal{H}_k = m | y_{0:k}) = \frac{p(\mathcal{H}_k = m | y_{0:k-1}) p_m(y_k | y_{0:k-1})}{\sum_{j=1}^{M} p(\mathcal{H}_k = j | y_{0:k-1}) p_j(y_k | y_{0:k-1})}$$

Where, $p(\mathcal{H}_k = M|y_{0:k-1})$ is a priorprior probability of selecting the m-th model; $p_m(y_k|y_{0:k-1})$ is a marginal likelihood of selecting the m-th model.

Preferably, a forgetting factor $\alpha$ can be determined to retain part of the historical information, that is, the prior probability of selecting the m-th model at the current moment is influenced by the posterior probability of selecting the m-th model at the previous moment. The priorprior probability of selecting the m-th model is calculated as follows:

$$p(\mathcal{H}_k = m | y_{0:k-1}) = \frac{p(\mathcal{H}_{k-1} = m | y_{0:k-1})^\alpha}{\sum_{j=1}^{M} p(\mathcal{H}_{k-1} = j | y_{0:k-1})^\alpha}$$

where, $p(\mathcal{H}_{k-1} = m|y_{0:k-1})$ is the probability of selecting the m-th model at the k-1-th moment; a (0<α<1) is a forgetting factor.

Preferably, at the moment k, the calculation method of the marginal likelihood of selecting the m-th model is as follows:

$$p_m(y_k|y_{0:k-1}) = \int p_m(y_k|x_k) p(x_k|y_{0:k-1}) dx_k$$

where $p_m(y_k|x_k)$ is a likelihood function for the m-th model.

In step (4), adopting a particle filter algorithm for the state estimation, and calculating $p(x_k|\mathcal{H}_k = m, y_{0:k})$ and $p(\mathcal{H}_k = m|y_{0:k})$ based on particles.

Based on the traditional state-space model and particle filtering, the present invention proposes a multi-model dynamic ensemble method applied to the neural signal decoding, which reduces the influence caused by the unstability of the neural signal to a certain extent. It outperforms the well-known Kalman filter algorithm in the test, proving the effectiveness of the method.

DETAILED DESCRIPTION OF THE EMBODIMENTS

Figure 1:
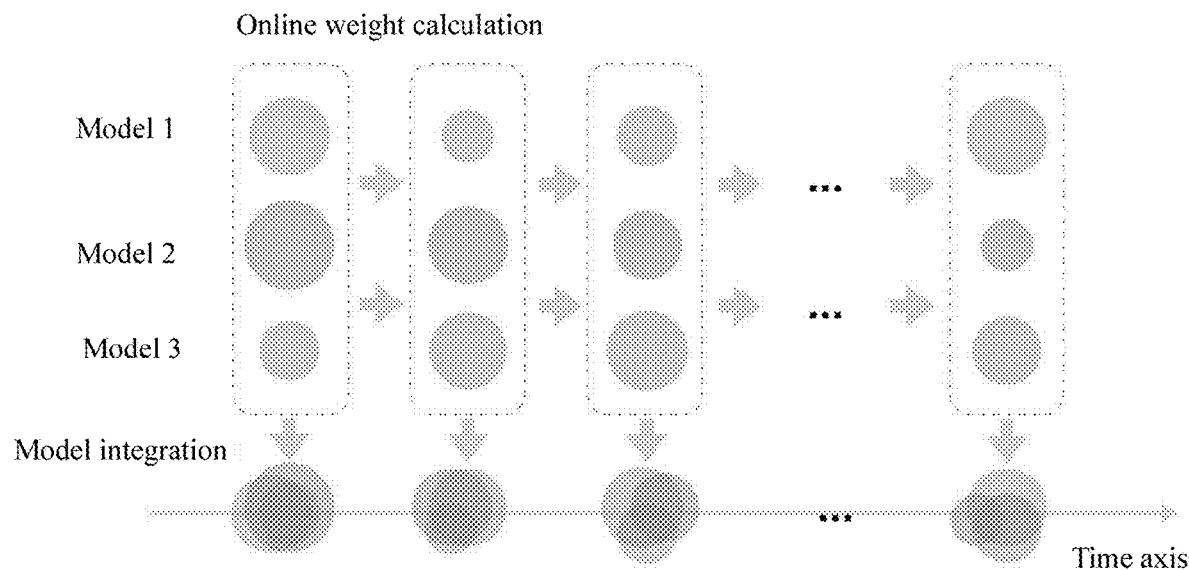
FIG. 1 is a schematic figure of a multi-model dynamic ensemble process in the method of the present invention.

The present invention will be further described in detail below with reference to the accompanying drawings and embodiments. It should be pointed out that the following embodiments are intended to facilitate the understanding of the present invention, but do not have any limiting effect on it.

All clinical and experimental procedures in this embodiment were approved by the Medical Ethics Committee of the Second Affiliated Hospital of Zhejiang University (ethical review number 2019-158). Informed consent was obtained orally by the participants and their immediate family members and signed by their legal representatives. The volunteer was a 74-year-old male who suffered a car accident three years ago and was paralyzed after a C4 cervical spine trauma. The volunteer is only able to move the parts above the neck and has normal language skills and comprehension ability of all tasks. For a limb motion behavior, the patient has a skeletal muscle strength score of 0/5 and a complete loss of limb motion control.

Two 96-channel Utah intracortical microelectrode arrays (4 mm×4 mm, 1.4 mm long Utah arrays, Blackrock Microsystems, Salt Lake City, Utah, USA) were implanted in the left primary motor cortex of the volunteer, and the other was located in the central hand knob area 2 mm away. Electron Computed Tomography and functional MRI were used to guide the implantation. During the implantation, the participant was asked to perform flexion and extension motions of the elbow, and the scanning of the functional MRI was used to confirm an activation area in the motor cortex. The operation used a robotic arm to assist in implanting electrodes during the surgery. The participant had a week of rehabilitation before starting the neural signal recording and BCI training tasks.

The participant performed the BCI training tasks each weekday and rested on weekends. The training time was approximately 3 hours per day and comprised of preparation for signal recording, impedance testing, spike classification and paradigm tasks. The experiment was stopped once the participant felt tired or developed physical abnormalities, such as a fever or a urinary tract infection. The entire experiment lasted half a year, recording the neural signals for 12 weeks.

A 2D cursor control task was performed on a computer monitor 1.5 m in front of the volunteer. The task contained eight targets at the top, bottom, left, right and four corners of the screen. The targets can be displayed sequentially in a clockwise or pseudo-random fashion. The relevant parameters of the task can be configured in task settings, comprising a distance from the target to the center of the screen, the diameter of a target ball, the maximum trial time, an arrival threshold, the minimum dwell time and the number of repetitions after failure. For each experimental trial, the volunteer was asked to control a blue cursor ball from the center of the screen to a red target ball. In a successful trial, the distance between the centers of the blue and red balls should be less than a preset arrival threshold, and dwell time should not be shorter than a preset dwell time. The maximum duration of each trial is set from 2 to 5 seconds. An audible cue is given at the end of the trial to indicate its success. A maximum of 4 attempts were made after each trial failed. The default setting was to display the target balls at 15 cm from the center of the screen, with a diameter of 5 cm.

For the adaptive brain-computer interface decoding method based on multi-model dynamic ensemble proposed by the present invention, the specific implementation was as follows:

Step 1, motor neural signal pre-processing: obtaining an original motor neural signal recorded from the electrodes, selecting an appropriate window size to calculate the firing rate of the neural signal, intercepting a valid data segment according to a state label, normalizing and smoothing the data, and obtaining the pre-processed motor neural signal; dividing the data into a training set, a validation set, and a test set according to a proper proportion;

Specifically, the experiment recorded the neural signals by using a Neuroport system (NSP, Blackrock Microsystems). The neural activity is amplified, digitized, and recorded at 30 KHz. Thresholds for neural action potential detection were set from −6.5 RMS to −5.5 RMS for each high-pass filtered (250 Hz cutoff frequency) electrode by using a Central software package (Blackrock Microsystem). At the beginning of each routine task, the researchers manually sort the spikes, which takes about 25 to 35 minutes. A peak activity was converted to firing rate in 20 ms and low-pass filtered by using an exponential smoothing function with a 450 ms window.

Step 2, a state-space model based on the dynamic ensemble:

2-1. An improved observation model: varying a traditional state-space model, using a set of functions (i.e., candidate models) instead of a fixed function to dynamically characterize the relationship between observation variables and state variables;

The traditional state-space model consists of a state transition function $f(\cdot)$ and an observation function $h(\cdot)$:

$$x_k = f(x_{k-1}) + v_{k-1}$$

$$y_k = h(x_k) + n_k$$

Where, k represents a discrete time step; $x_k \in R^{d_x}$ represents the state that is concerned about; $y_k \in R^{d_y}$ represents the observation variable; $v_k$, $n_k$ represents a state transition noise and an observation noise which are independent and identically distributed.

In the field of the neural decoding, states and observations represent motion trajectories and neural signals, respectively. Given a neural signal sequence $y_{0:k}$, the task of the neural decoding is to iteratively estimate the probability density of $x_k$. The Kalman filter can provide an analytically optimal solution when both the neural signal and the motion signal conform to a linear Gaussian assumption.

The observation function $h(\cdot)$ of the traditional state-space model is determined in advance and cannot adapt to changing neural signals. The observation model in step 2 improves upon it by allowing the observation function to be adjusted online. The improved observation function is expressed as follows:

$$y_k = h_{\mathcal{H}_k}(x_k) + n_k$$

Where, k represents a discrete time step; $x_k \in R^{d_x}$ represents a state of interest; $y_k \in R^{d_y}$ represents the observation variable; $n_k$ represents an independent and identically distributed observation noise; $\mathcal{H}_k \in \{1, 2, \ldots, M\}$ represents a model index in the observation equation. In particular, $\mathcal{H}_k = m$ represents the model in action at the moment k is $h_m$.

The models in a model set $\mathcal{M}$, similar to neural encoders, can convert input kinematic parameters $x_t$ into the neural signals $y_t$. In the multi-model dynamic ensemble method, we learn a pool of forms of encoding models, such as linear functions, polynomial functions, and neural networks, to enhance the ensemble effectiveness of online models. Past research has demonstrated an excellent decoding ability of linear models, while non-linear models have strong robustness in the presence of noise. As shown in FIG. 1, the multi-model dynamic ensemble method demonstrates the advantages of different models to deal with unstable neural signals.

Specifically, the model pool of this example contains four models. The first model is a linear function $H_l(x) = Wx + b$, which is similar to the observation model in the Kalman filter. The second model is a second-order polynomial function $H_p(x) = a_0 + a_1 x + a_2 x^2$. The third model $H_{nn1}(\cdot)$ and the fourth model $H_{nn2}(\cdot)$ are two neural networks with different parameter sizes. Both the neural networks contain one hidden layer. The number of neurons in the input layer is equal to the dimensions of the motion parameters $x_t$, and the number of neurons in the output layer is equal to the dimensions of the neural signal $y_t$. The number of neurons in the hidden layers are 30 and 50, respectively.

For $H_l(\cdot)$ and $H_p(\cdot)$, the parameters are estimated by using the least square method. For $H_{nn1}(\cdot)$ and $H_{nn2}(\cdot)$, the parameters are optimized by using the Adam algorithm, a learning rate is set to 0.01, and a weight decay is set to 1e-4. At the same time, an early-stopping method is adopted to alleviate the overfitting problem.

2-2 Dynamically combining the candidate models according to a Bayesian update mechanism as an observation function of the state-space model;

In step 2, a set of candidate models are used to characterize the functional relationship between the observation signal and the state to be predicted. The Bayesian update mechanism dynamically selects dominant models among these models in a data-driven manner. Given an observation sequence $y_{0:k}$, the posterior probability of the state at the moment k is:

$$p(x_k | y_{0:k}) = \sum_{m=1}^{M} p(x_k | \mathcal{H}_k = m, y_{0:k}) p(\mathcal{H}_k = m | y_{0:k})$$

Where, $p(x_k|\mathcal{H}_k=m, y_{0:k})$ is the posterior of the state when $\mathcal{H}_k = p(\mathcal{H}_k=m|y_{0:k})$ is the posterior probability of selecting the m-th model.

Considering that $p(\mathcal{H}_k=m|y_{0:k})$ is obtained by iteration of $p(\mathcal{H}_k=m|y_{0:k-1})$, preferably, the Bayesian formula can be used to calculate the posterior probability of selecting the m-th model at the moment k.

$$p(\mathcal{H}_k=m|y_{0:k}) = \frac{p(\mathcal{H}_k=m|y_{0:k-1})p_m(y_k|y_{0:k-1})}{\sum_{j=1}^{M} p(\mathcal{H}_k=j|y_{0:k-1})p_j(y_k|y_{0:k-1})}$$

Where, $p(\mathcal{H}_k=m|y_{0:k-1})$ is a priorprior probability of selecting the m-th model; $p_m(y_k|y_{0:k-1})$ is a marginal likelihood of selecting the m-th model.

Preferably, a forgetting factor α can be determined to retain part of the historical information, that is, the prior probability of selecting the m-th model at the current moment is influenced by the posterior probability of selecting the m-th model at the previous moment:

$$p(\mathcal{H}_k=m|y_{0:k-1}) = \frac{p(\mathcal{H}_{k-1}=m|y_{0:k-1})^\alpha}{\sum_{j=1}^{M} p(\mathcal{H}_{k-1}=j|y_{0:k-1})^\alpha}$$

Where, $p(\mathcal{H}_{k-1}=m|y_{0:k-1})$ is the probability of selecting the m-th model at the k-1-th moment; α(0<α<1) is a forgetting factor.

In this example, the forgetting factor is set from 0.1 to 0.9. When the forgetting factor is set to 0.9, the influence of the previous kinematic state is considered to a great extent, so the decoded kinematic state is smoother.

Preferably, at the moment k, the calculation method of the marginal likelihood of selecting the m-th model is as follows:

$$p_m(y_k|y_{0:k-1}) = \int p_m(y_k|x_k)P(x_k|y_{0:k-1})dx_k$$

Where $p_m(y_k|x_k)$ is a likelihood function for the m-th model.

Step 3, candidate model learning and state estimation: using the training set and the validation set to obtain a set of different candidate models;

Preferably, based on the particle filter algorithm, estimating the kinematic state for each candidate model by using a weighted particle set at each time step, and calculating $p(x_k|\mathcal{H}_k=m, y_{0:k})$ and $p(\mathcal{H}_k=m|y_{0:k})$ in step 2.

Assuming that this moment is the beginning of the k-th time step, and $p\mathcal{H}_{k-1}=m|y_{0:k})$, m=1, . . . , M and the weight of the particle set are known, where $N_S$ represents the size of the particle set and $x_{k-1}^i$ is the particle with the weight of $\omega_{k-1}^i$. Assuming $p(x_{k-1}|y_{0:k-1})\approx\sum_{i=1}^{N_s}\omega_{k-1}^i\delta(x_{k-1}-x_{k-1}^i)$, where δ(·) represents a Dirac δ function, here is how to compute $p(x_k|\mathcal{H}_k=m, y_{0:k})$ and $p(\mathcal{H}_k=m|y_{0:k})$ by using particle filtering:

3-1, $p(x_k|\mathcal{H}_k=m, y_{0:k})$ based on the particle filtering. First, $x_k^i$ is obtained from the state transition prior $p(x_k|x_{k-1}^i)$, i=1, . . . , $N_S$, and then according to the principle of importance sampling, we can get:

$$p(x_k|\mathcal{H}_k=y_{0:k})\approx\sum_{i=1}^{N_s}\omega_{m,k}^i\delta(x_k-x_k^i)$$

Where, $\omega_{m,k}^i \propto \omega_{k-1}^i p_m(y_k|x_k^i)$, $\sum_{i=1}^{N_s}\omega_{m,k}^i=1$. $\omega_{m,k}^i$ represents the normalized importance weight of the i-th particle when the m-th model is selected.

In this example, the training set is used as the particle set to avoid the instability caused by randomly scattering the particles.

3-2, $p(\mathcal{H}_k=m|y_{0:k})$ based on the particle filtering. Given $p(\mathcal{H}_{k-1}=m|y_{0:k-1})$, first, the priorprior probability of $\mathcal{H}_k=m$ is computed by using the forgetting factor in step 2. The posterior probability $p_m(y_k=m|y_{0:k})$ of $\mathcal{H}_k=m$ can be calculated when the likelihood $p_m(y_k|y_{0:k-1})$, m=1, . . . , M is known. In the step 3-1, the state transition prior is used as the importance function, i.e., $q(x_k|x_{k-1}, y_{0:k})=p(x_k|x_{k-1})$. Therefore, the distribution of $x_k$ can be approximated by the particles, i.e, $p(x_k|y_{0:k-1})\approx\sum_{i=1}^{i}\delta_{x_k}^i$. Further, we get:

$$p_m(y_k|y_{0:k-1})\approx\sum_{i=1}^{N_s}\omega_{k-1}^i p_m(y_k|x_k^i)$$

Note that the particle filtering usually suffers from particle degradation, and after a few iterations, only a small number of particles have high weights. Therefore, we adopt a resampling method to remove particles with too small or too large weights to alleviate the particle degradation problem.

Step 4, performance evaluation of the multi-model dynamic ensemble method: using this method to compare with other methods in the test set data to evaluate the performance and robustness of this method.

This example was an online experiment with closed-loop calibration. Two phases of calibration and testing were contained in each experiment. Each session contains several blocks, and each block consists of 16 trials, where 2 trials for each target. The neural decoder was trained during the calibration phase. There were two observation blocks in the calibration phase, and the computer automatically completed the cursor control task. The neural signals of the volunteer during the observation phase were used to initialize the decoder. Subsequently, the decoder was further adjusted by using computer-assistant and ortho-impedance assistance, and the assistant ratio decreased with the increase of the number of blocks. The calibration process lasted about 10 minutes, and then the neural signals coming in the test phase were decoded by using the trained decoder.

Figure 2:
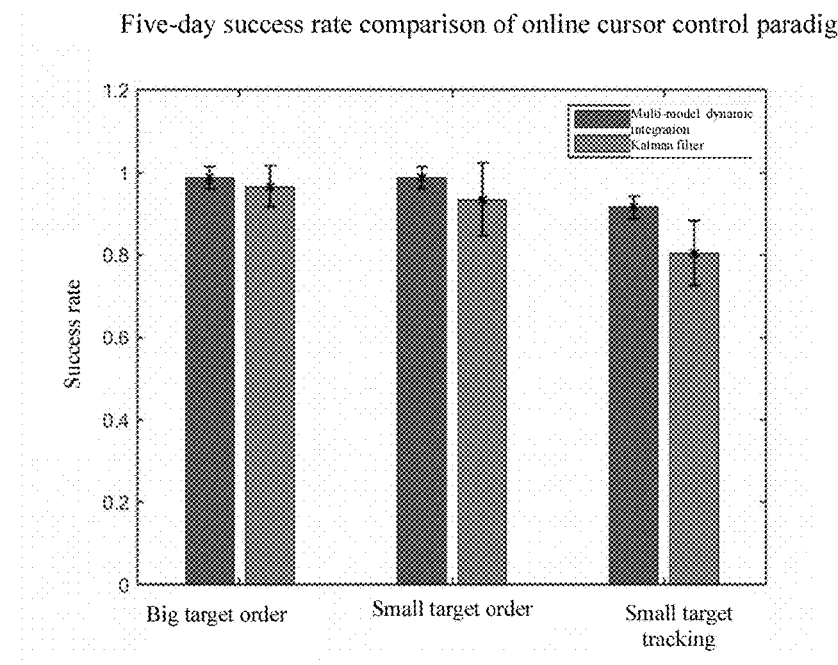
FIG. 2 is a comparison chart of the success rate of a Kalman filter and multi-model dynamic ensemble for five consecutive days in an online cursor control experiment in an embodiment of the present invention.
Figure 3:
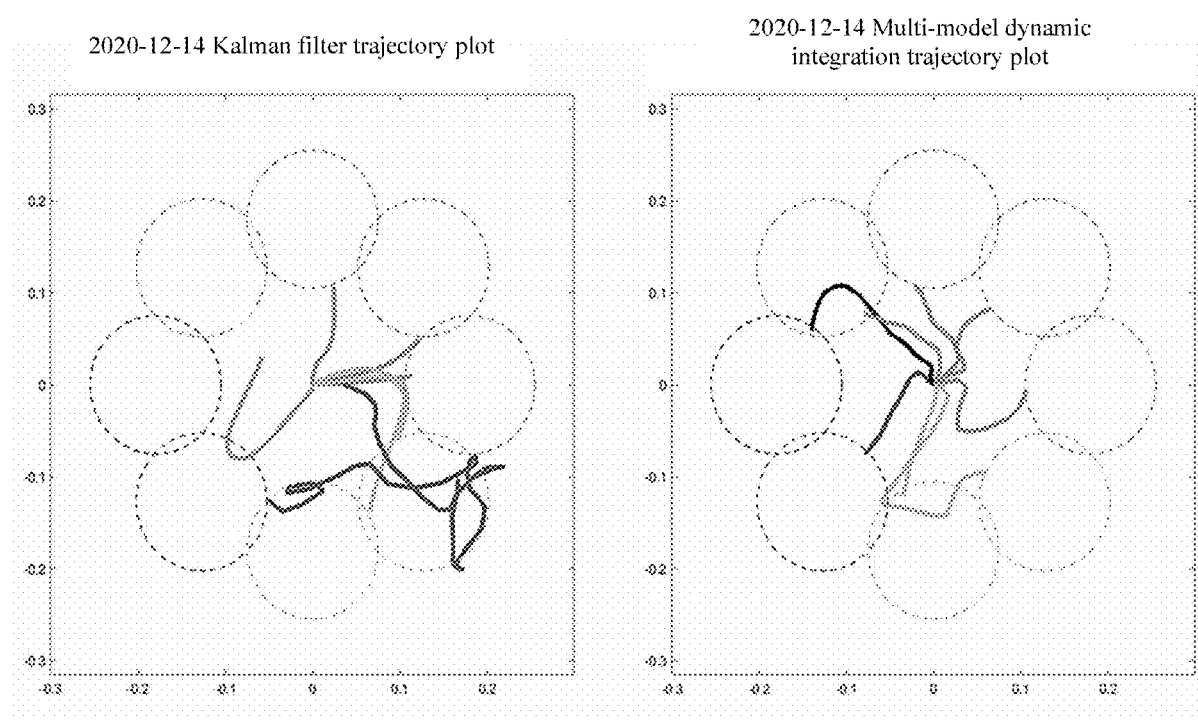
FIG. 3 is a trajectory comparison figure of a Kalman filter and multi-model dynamic ensemble in an online cursor control experiment on Dec. 14, 2020, according to an embodiment of the present invention.

In order to compare and illustrate the effectiveness of the neural signal decoding method proposed by the present invention, the success rate statistics were performed on the online experimental data for five consecutive days, and FIG. 2 was obtained. Compared with the Kalman filter, the online success rate of the multi-model dynamic ensemble method was increased by 2.30% (the big ball), 5.68% (the small ball), 13.85% (tracing), and the arrival time was shortened by 3.52% (the big ball), 8.81% (the small ball), 13.46% (tracing), and the performance of different days was more stable, the variance was 47.50% smaller than the Kalman filter (the big ball), 70.42% (the small ball), 64.51% (tracing). FIG. 3 is the trajectory diagram of the ball test phase on Dec. 14, 2020. It can be seen that the trajectory solved by the Kalman filter has a strong bias and cannot reach each target point on time.

However, the trajectory distribution solved by the multi-model dynamic ensemble method is relatively uniform and successfully reaches each target point. It can be seen from the above results that the performance of the multi-model dynamic ensemble method is more stable.

The above-mentioned embodiments describe the technical solutions and beneficial effects of the present invention in detail. It should be understood that the above-mentioned embodiments are only specific embodiments of the present invention, and are not intended to limit the present invention. Any modifications, additions and equivalent replacements made within the scope of the principles of the present invention shall be included within the protection scope of the present invention.

The invention claimed is:

1. A computer-implemented adaptive brain-computer interface decoding method based on multi-model dynamic ensemble and executed by a processor, where the method comprises the following steps:

(1) obtaining an original motor and neural signal collected by electrodes implanted in a brain of a subject, specifically comprising: planting the electrodes in a primary motor cortex of the subject for recording the original motor and neural signal; the subject being asked to imagine performing a two dimensional (2D) cursor control task on a computer monitor to move a cursor from a center of the computer monitor through a trajectory to a target; recording the subject's neural signals simultaneously during the cursor control task to obtain the original motor and neural signal; and after pre-processing the original motor and neural signal, dividing the signal into a training set, a validation set and a test set;

(2) building a state-space decoder based on the multi-model dynamic ensemble, which is specified as follows:

(2-1) with a state-space model, using a pool of candidate models to dynamically characterize a relationship between observation variables and state variables, where the pool of candidate models comprise a linear function $H_1(x)=Wx+b$, wherein $H_l(x)$ represents a linear mapping function from movement states x to neural signals, W and b represent linear regression parameters; a second-order polynomial function $H_p(x)=a_0+a_1x+a_2x^2$, wherein $H_p(x)$ represents a polynomial mapping function from movement states x to neural signals, where $a_0$, $a_1$ and $a_2$ represent the polynomial regression parameters for the term of bias, x and $x^2$, respectively, and two neural networks $H_{nn1}(\cdot)$ and $H_{nn2}(\cdot)$, and, the observation variables are neural signals, and the state variables are kinematic signals;

(2-2) dynamically combining the candidate models according to a Bayesian update mechanism as an observation function of the state-space model;

(3) using the training set and the validation set to train and evaluate the state-space model, and obtaining parameters of different candidate models by training;

(4) using the test set to test a performance and robustness of the state-space model, applying a neural signal decoding, and obtaining a state estimation after inputting the pre-trained neural signal to be decoded;

where in the step (2-1), an expression of the state-space model is as follows:

$$X_k = f(x_{k-1}) + V_{k-1}$$

$$y_k = h_{H_k}(x_k) + n_k$$

where, k represents a discrete time step; $x_k \in R^{d_x}$ represents a state of interest; $f(\cdot)$ represents a state transition function; $y_k \in R^{d_y}$ represents an observation or measurement variable; $n_k$ represents an independent and identically distributed observation noise; $H_k \in \{1, 2, \ldots, M\}$ represents a model index in the observation function $h(\cdot)$, $H_k=m$ represents that the model used at the moment k is $h_m$;

for $H_l(\cdot)$ and $H_p(\cdot)$, the parameters are estimated by using the least square method, for $H_{nn1}(\cdot)$ and $H_{nn2}(\cdot)$, the parameters are optimized by using an Adam algorithm, a learning rate is set to 0.01, and a weight decay is set to 1e-4; at a same time, an early-stopping method is adopted to alleviate an overfitting problem;

where in the step (2-2), the Bayesian update mechanism is as follows:

dynamically selecting and switching among a pool of candidate models in a data-driven manner, where given an observation sequence $y_{0:k}$, a posterior probability of a state at the moment k is:

$$p(x_k|y_{0:k}) = \Sigma_{m=1}^{M} p(x_k | \mathcal{H}_k = m, y_{0:k}) p(\mathcal{H}_k = m | y_{0:k})$$

where, $p(x_k|H_k=m, y_{0:k})$ is the posterior of the state when $H_k=m$; $p(H_k=m|y_{0:k})$ is the posterior probability of selecting the m-th model; M represents the number of the candidate models;

wherein, the step (3) specifically comprises the following steps:

step (3.1): based on a particle filter algorithm, estimating motion state for each candidate model by using a weighted particle set at each time step, and calculating $p(x_k|H_k=m, y_{0:k})$ and $p(H_k=m|y_{0:k})$ in the step (2);

step (3.2): assuming that this moment is beginning of the k-th time step, and $p(H_{k-1}=m|y_{0:k})$, $m=1, \ldots, M$ and a particle set with a weight are known, wherein $N_s$ represents the size of the particle set and $x_{k-1}^i$ is the particle with the weight of $\omega_{k-1}^i$, and assuming $p(x_{k-1}|y_{0:k-1}) \approx \Sigma_{i=1}^{N_s} \omega_{k-1}^i \delta(x_{k-1}-x_{k-1}^i)$, wherein $\delta(\cdot)$ represents a Dirac $\delta$ function, calculating $p(x_k | \mathcal{H}_k = m, y_{0:k})$ and $p(\mathcal{H}_k = m | y_{0:k})$ by using particle filtering as follows:

step (3.2.1): obtaining $x_k^i$ from the state transition priori $p(x_k|X_{k-1}^i)$, $i=1, \ldots, N_s$, and then according to a principle of importance sampling, obtaining:

$$p(x_k|H_k=m, y_{0:k}) \approx \Sigma_{i=1}^{N_s} \omega_{m,k}^i \delta(x_k-x_k^i)$$

wherein, $\omega_{m,k}^i \propto \omega_{k-1}^i p_m(y_k|x_k^i)$, $\Sigma_{i=1}^{N_s} \omega_{m,k}^i = 1 \cdot \omega_{m,k}^i$ represents the normalized importance weight of the i-th particle when the m-th model is selected;

step (3.2.2): assuming $p(H_{k-1}=m|y_{0:k-1})$, first, computing the priori probability of $H_k=m$ by using the forgetting factor in the step (2), calculating posterior probability $p(H_k=m|y_{0:k})$ of $H_k=m$ when the likelihood $P_m(y_k|y_{0:k-1})$, $m=1, \ldots, M$ is known; in the step (3.2.1), using state transition priori is the function, $q(x_k|x_{k-1}, y_{0:k})=p(x_k|x_{k-1})$, approximating the distribution of $x_k$ by the particles, $p(x_{k-1}|y_{0:k-1}) \approx \Sigma_{i=1}^{N_s} \omega_{k-1}^i \delta x_k^i$, and obtaining:

$$p_m(y_k|y_{0:k-1}) \approx \Sigma_{i=1}^{N_s} \omega_{k-1}^i p_m(y_k|x_k^i)$$

step (5): outputting decoded neural signal to an exoskeleton device or a computer cursor control device.

2. The computer-implemented adaptive brain-computer interface decoding method based on multi-model dynamic ensemble and executed by a processor according to claim 1, where in step (1), the specific process of the pre-processing is as follows:

selecting an appropriate window size to calculate a firing rate of the neural signal, intercepting a valid data segment according to a state label, normalizing and smoothing the data respectively, and obtaining the pre-processed motor and neural signal.

3. The computer-implemented adaptive brain-computer interface decoding method based on multi-model dynamic ensemble and executed by a processor according to claim 1, where the posterior probability of selecting the m-th model is calculated as follows:

$$p(\mathcal{H}_k = m \mid y_{0:k}) = \frac{p(\mathcal{H}_k = m \mid y_{0:k-1}) p_m(y_k \mid y_{0:k-1})}{\sum_{j=1}^{M} p(\mathcal{H}_k = j \mid y_{0:k-1}) p_j(y_k \mid y_{0:k-1})}$$

where, $p(H_k=m|y_{0:k-1})$ is a prior probability of selecting the m-th model; $P_m(y_k|y_{0:k-1})$ is a marginal likelihood of selecting the m-th model.

4. The computer-implemented adaptive brain-computer interface decoding method based on multi-model dynamic ensemble and executed by a processor according to claim 3, where the prior probability of selecting the m-th model is calculated as follows:

$$p(\mathcal{H}_k = m \mid y_{0:k-1}) = \frac{p(\mathcal{H}_{k-1} = m \mid y_{0:k-1})^\alpha}{\sum_{j=1}^{M} p(\mathcal{H}_{k-1} = j \mid y_{0:k-1})^\alpha}$$

where, $p(H_{k-1}=m|y_{0:k-1})$ is the probability of selecting the m-th model at the k-1-th moment; α is a forgetting factor, 0<α<1.

5. The computer-implemented adaptive brain-computer interface decoding method based on multi-model dynamic ensemble and executed by a processor according to claim 3, where the marginal likelihood of selecting the m-th model is calculated as follows:

$$p_m(y_k|y_{0:k-1}) = \int p_m(y_k|x_k) P(x_k|y_{0:k-1}) dx_k$$

where $p_m(y_k|x_k)$ is a likelihood function for the m-th model.

6. The computer-implemented adaptive brain-computer interface decoding method based on multi-model dynamic ensemble and executed by a processor according to claim 3, where in the step (4), adopting a particle filter algorithm for the state estimation, and calculating $p(x_k|H_k=m,y_{0:k})$ and $p(H_k=m|y_{0:k})$ based on particles.

7. A computer-implemented adaptive brain-computer interface decoding method based on multi-model dynamic ensemble and executed by a processor, where the method comprises the following steps:
(1) obtaining an original motor and neural signal collected by electrodes implanted in a brain of a subject, specifically comprising: planting the electrodes in a primary motor cortex of the subject for recording the original motor and neural signal; the subject being asked to imagine performing a two dimensional (2D) cursor control task on a computer monitor to move a cursor from a center of the computer monitor through a trajectory to a target; recording the subject's neural signals simultaneously during the cursor control task to obtain the original motor and neural signal; and after pre-processing the original motor and neural signal, dividing the signal into a training set, a validation set and a test set;
(2) building a state-space decoder based on the multi-model dynamic ensemble, which is specified as follows:
(2-1) with a state-space model, using a pool of candidate models to dynamically characterize a relationship between observation variables and state variables, where the pool of candidate models comprise a linear function, a second-order polynomial function, and two neural networks, and, the observation variables are neural signals, and the state variables are kinematic signals;
(2-2) dynamically combining the candidate models according to a Bayesian update mechanism as an observation function of the state-space model;
(3) using the training set and the validation set to train and evaluate the state-space model, and obtaining parameters of different candidate models by training;
(4) using the test set to test a performance and robustness of the state-space model, applying a neural signal decoding, and obtaining a state estimation after inputting the pre-trained neural signal to be decoded;
step (5): outputting decoded neural signal to an exoskeleton device or a computer cursor control device;
where in step (1), the specific process of the pre-processing is as follows:
selecting an appropriate window size to calculate a firing rate of the neural signal, intercepting a valid data segment according to a state label, normalizing and smoothing the data respectively, and obtaining the pre-processed motor and neural signal;
where in the step (2), an expression of the state-space model is as follows:

$$X_k = f(x_{k-1}) + V_{k-1}$$

$$y_k = h_{H_k}(x_k) + n_k$$

where, k represents a discrete time step; $x_k \in R^{d_x}$ represents a state of interest; $f(\cdot)$ represents a state transition function; $y_k \in R^{d_y}$ represents a state of observation or measurement variable; $n_k$ represents an independent and identically distributed observation noise; $H_k \in \{1, 2, \ldots, M\}$ represents a model index in the observation function $h(\cdot)$, $H_k=m$ represents that the model used at the moment k is $h_m$;
where in the step (2), the Bayesian update mechanism is as follows:
dynamically selecting and switching among a pool of candidate models in a data-driven manner, where given an observation sequence $y_{0:k}$, a posterior probability of a state at the moment k is:

$$p(x_k|y_{0:k}) = \sum_{m=1}^{M} p(x_k|H_k=m, y_{0:k}) p(H_k=m|y_{0:k})$$

where, $p(x_k|H_k=m,y_{0:k})$ is the posterior of the state when $H_k=m$; $p(H_k=m|y_{0:k})$ is the posterior probability of selecting the m-th model; M represents the number of the candidate models;
where the posterior probability of selecting the m-th model is calculated as follows:

$$p(\mathcal{H}_k = m|y_{0:k}) = \frac{p(\mathcal{H}_k = m|y_{0:k-1}) p_m(y_k|y_{0:k-1})}{\sum_{j=1}^{M} p(\mathcal{H}_k = j|y_{0:k-1}) p_j(y_k|y_{0:k-1})}$$

where, $p(H_k=m|y_{0:k-1})$ is a prior probability of selecting the m-th model; $P_m(y_k|y_{0:k-1})$ is a marginal likelihood of selecting the m-th model;
where the prior probability of selecting the m-th model is calculated as follows:

$$p(\mathcal{H}_k = m|y_{0:k-1}) = \frac{p(\mathcal{H}_{k-1} = m|y_{0:k-1})^\alpha}{\sum_{j=1}^{M} p(\mathcal{H}_{k-1} = j|y_{0:k-1})^\alpha}$$

where, $p(H_{k-1}=m|y_{0:k-1})$ is the probability of selecting the m-th model at the k-1-th moment; α is a forgetting factor, 0<α<1;

where the marginal likelihood of selecting the m-th model is calculated as follows:

$$p_m(y_k|y_{0:k-1}) = \int p_m(y_k|x_k) P(x_k|y_{0:k-1}) dx_k$$

where $p_m(y_k|x_k)$ is a likelihood function for the m-th model;

wherein, the step (3) specifically comprises the following steps:

step (3.1): based on a particle filter algorithm, estimating motion state for each candidate model by using a weighted particle set at each time step, and calculating $p(x_k|H_k=m, y_{0:k})$ and $p(H_k=m|y_{0:k})$ in the step (2);

step (3.2): assuming that this moment is beginning of the k-th time step, and $p(H_{k-1}=m|y_{0:k})$, m=1, ..., M and a particle set with a weight are known, wherein $N_s$ represents the size of the particle set and $x_{k-1}^i$ is the particle with the weight of $\omega_{k-1}^i$, and assuming $p(x_{k-1}|y_{0:k-1}) \approx \sum_{i=1}^{N_s} \omega_{k-1}^i \delta(x_{k-1}-x_{k-1}^i)$, wherein $\delta(\cdot)$ represents a Dirac $\delta$ function, calculating $p(x_k|\mathcal{H}_k=m, y_{0:k})$ and $p(H_k=m|y_{0:k})$ by using particle filtering as follows:

step (3.2.1): obtaining $x_k^i$ from the state transition priori $p(x_k|X_{k-1}^i)$, i=1, ..., $N_s$, and then according to the principle of importance sampling, obtaining:

$$p(x_k|H_k=m,y_{0:k}) \approx \sum_{i=1}^{N_s} \omega_{m,k}^i \delta(x_k-x_k^i)$$

wherein, $\omega_{m,k}^i \propto \omega_{k-1}^i p_m(y_k|x_k^i)$, $\sum_{i=1}^{N_s} \omega_{m,k}^i = 1 \cdot \omega_{m,k}^i$ represents the normalized importance weight of the i-th particle when the m-th model is selected;

step (3.2.2): assuming $p(H_{k-1}=m|y_{0:k-1})$, first, computing the priori probability of $H_k=m$ by using the forgetting factor in the step (2), calculating posterior probability $p(H_k=m|y_{0:k})$ of $H_k=m$ when the likelihood $P_m(y_k|y_{0:k-1})$, m=1, ..., M is known; in the step (3.2.1), using state transition priori is the function, $q(x_k|x_{k-1}, y_{0:k})=p(x_k|x_{k-1})$, approximating the distribution of $x_k$ by the particles, $p(x_{k-1}|y_{0:k-1}) \approx \sum_{i=1}^{N_s} \omega_{k-1}^i \delta x_i^k$, and obtaining:

$$p_m(y_k|y_{0:k-1}) \approx \sum_{i=1}^{N_s} \omega_{k-1}^i p_m(y_k|x_k^i)$$

where in the step (4), adopting a particle filter algorithm for the state estimation, and calculating $p(x_k|H_k=m, y_{0:k})$ and $p(H_k=m|y_{0:k})$ based on particles.

8. The computer-implemented adaptive brain-computer interface decoding method based on multi-model dynamic ensemble and executed by a processor according to claim 4, wherein $\alpha=0.9$.

* * * * *